United States Patent [19]

Hickok

[11] Patent Number: 5,603,831

[45] Date of Patent: Feb. 18, 1997

[54] DUAL IMPELLER PUMP

[75] Inventor: Roy S. Hickok, Moorpark, Calif.

[73] Assignee: Aquaria, Inc., Moorpark, Calif.

[21] Appl. No.: 248,110

[22] Filed: May 24, 1994

[51] Int. Cl.$^6$ .................... C02F 3/00; A01K 63/04
[52] U.S. Cl. .................... 210/601; 119/260; 210/150; 210/169; 210/359; 210/416.2; 210/780; 415/143; 416/198 R
[58] Field of Search .................... 210/150, 151, 210/169, 359, 413, 416.2, 767, 780, 601; 416/198 A, 198 R, 199, 201 A, 201 R; 417/81; 119/260, 259; 415/62, 143

[56] References Cited

U.S. PATENT DOCUMENTS

| | | | |
|---|---|---|---|
| 2,424,285 | 7/1947 | Piccardo et al. | 417/81 |
| 2,466,792 | 4/1949 | Conery | 417/81 |
| 2,623,466 | 12/1952 | Tinker | 416/201 R |
| 3,297,163 | 1/1967 | Landon . | |
| 4,039,453 | 8/1977 | Horvath | 210/169 |
| 4,512,885 | 4/1985 | Willinger | 210/416.2 |
| 4,732,236 | 3/1988 | Jacques | 184/6.2 |
| 4,915,828 | 4/1990 | Meyers et al. | 210/110 |
| 5,078,867 | 1/1992 | Danner | 210/169 |
| 5,084,164 | 1/1992 | Del Rosario | 210/94 |
| 5,171,438 | 12/1992 | Korcz | 210/169 |
| 5,228,986 | 7/1993 | Ellis et al. | 210/416.2 |
| 5,238,367 | 8/1993 | Ellis et al. | 416/188 |
| 5,401,401 | 3/1995 | Hickok et al. | 210/416.2 |
| 5,419,831 | 5/1995 | Fuerst et al. | 210/416.2 |
| 5,423,978 | 6/1995 | Snyder et al. | 210/416.2 |

FOREIGN PATENT DOCUMENTS

| | | | |
|---|---|---|---|
| 355311 | 8/1905 | France . | |
| 54-14011 | 2/1979 | Japan | 415/143 |
| 55-54690 | 4/1980 | Japan | 415/143 |
| 57-1439 | 1/1982 | Japan . | |
| 4148094 | 5/1992 | Japan . | |
| 718628 | 2/1980 | U.S.S.R. | 415/143 |
| 264514 | 4/1927 | United Kingdom . | |
| 1273664 | 7/1970 | United Kingdom . | |
| 2016290 | 9/1979 | United Kingdom . | |
| 2062102 | 5/1981 | United Kingdom | 415/143 |
| 2243558 | 11/1991 | United Kingdom . | |
| WO8504306 | 10/1985 | WIPO . | |

OTHER PUBLICATIONS

Search report dated Aug. 15, 1995, PCT application serial No. PCT/US95/05482, filed May 3, 1995.

*Primary Examiner*—Joseph W. Drodge
*Attorney, Agent, or Firm*—Loeb & Loeb LLP

[57] ABSTRACT

An improved aquarium pump for use with an aquarium filter which includes a filter box, a rotating biological filter element and a spray bar, the pump supplying water to the rotating biological filter element and the spray bar. The pump may include a pair of impellers for supplying water to the filter box and the spray bar, respectively.

38 Claims, 13 Drawing Sheets

PRIOR ART

DUAL IMPELLER PUMP

BACKGROUND OF THE INVENTION

1. Field of the Invention

The present invention relates to a pump for use with an aquarium filter, and more particularly, to a pump for use with an aquarium filter having a main filter and a secondary biological filter.

2. Description of the Related Art

Figure 1:
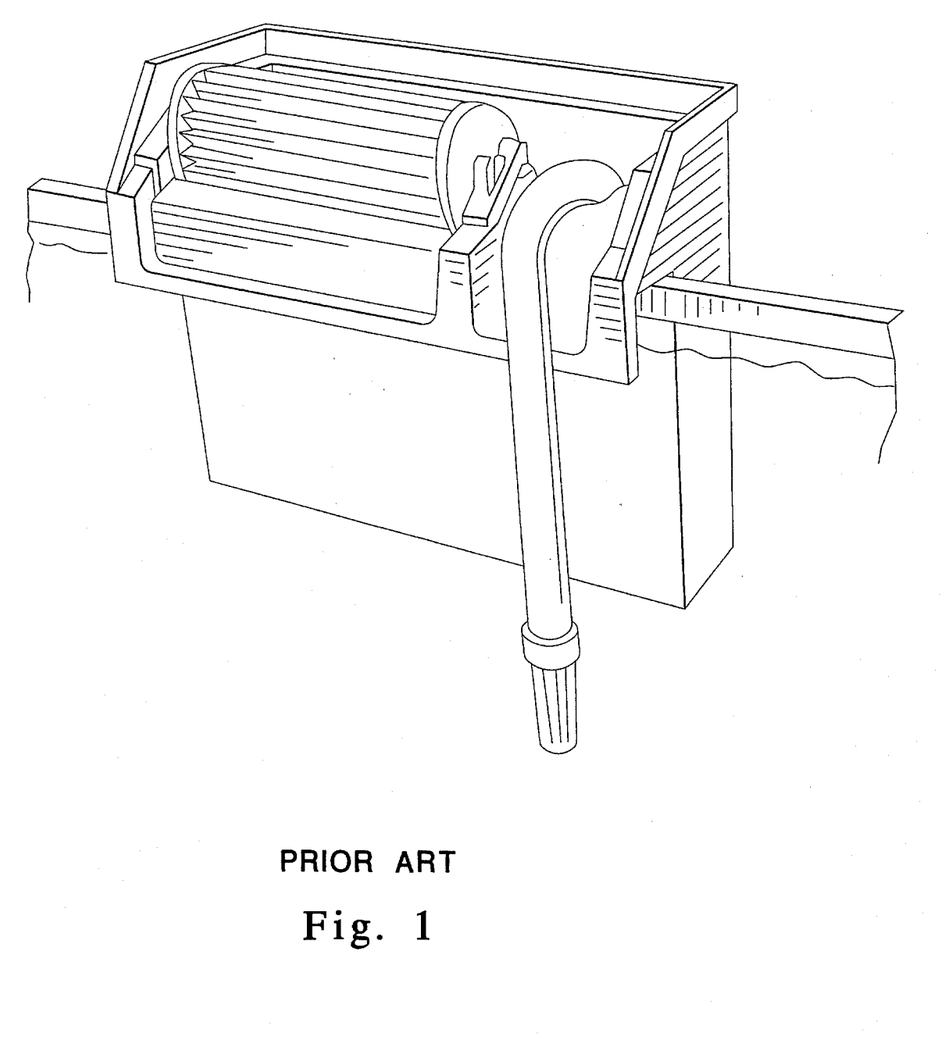
FIG. 1 is a perspective view of an aquarium filter system having a rotatably mounted biological filter element.

Copending application Ser. No. 08/004,677, filed Jan. 14, 1993, now U.S. Pat. No. 5,419,831 which is incorporated herein by reference, discloses an aquarium filter system which employs mechanical filtration to remove detritus from aquarium water and biological filtration to remove toxic substances such as ammonia from the water. Biological filtration relies on the presence of aerobic bacteria to convert the toxic substances to nontoxic or less toxic substances. The aerobic bacteria require oxygen to grow. In order to enhance growth of the aerobic bacteria, the filter systems of this type employ a rotatably mounted biological filter element positioned in a stream of aquarium water. One embodiment of such a filter system is illustrated in FIG. 1. The stream of water is directed below the filter element's rotational axis. As the filter element rotates, portions of the filter element and, accordingly, the aerobic bacteria, are alternately exposed to the atmosphere for growth and to the aquarium water for filtration.

The biological filter element in the '667 filter system is in the form of a turbine. The turbine may include a number of sheets made of porous filter material on which the aerobic bacteria grows. The sheets also serve as paddles. In such a filter system, aquarium water is preferably pumped through a mechanical filter element, and then past the biological filter element and finally back into the aquarium. As the water passes the biological filter element, it impinges on the paddles, thereby causing the biological filter element to rotate and alternately expose the aerobic bacteria to the atmosphere and to the aquarium water.

Because the aerobic bacteria relies on the rotation of the biological filter element for oxygen, it is important that the rate of rotation does not slow to an unacceptable level. Optimal bacteria growth occurs at relatively low rotation speeds (for example, less than 20 RPM). However, at such low speeds, erratic rotation of the biological filter element may occur due to normal imbalances in the biological filter element and friction in the bearing. Although satisfactory growth is likely to occur even if the rotation is somewhat erratic, erratic rotation is often perceived by the user as a problem and it may also result in less than optimal bacteria growth.

One solution to this problem is to provide a spray bar above the biological filter element which directs water onto the filter element in such a manner as to cause the filter element to rotate in the same direction as that caused by the water flowing under the filter element. As such, sufficient rotation of the biological filter element may be ensured. A drawback of this solution is the expense associated with the additional pumping power which has usually been required to supply water to the spray bar.

SUMMARY OF THE INVENTION

It is an object of the present invention to provide an improved pump obviating, for practical purposes, the above mentioned limitations.

In accordance with the present invention, these and other objectives are achieved by providing a pump capable of efficiently supplying water both to a filter box and to a spray bar. As such, a spray bar may be employed in a filter system which includes a rotating biological filter element without incurring the added expense of a substantially larger pump or a separate pump provided solely to supply water to the spray bar.

In one aspect of the present invention, the pump may include an impeller having a first set of impeller blades which supply aquarium water to the filter box and a second set of impeller blades which supply water to the spray bar.

In another aspect of the present invention, the pump may include a first impeller which supplies aquarium water to the filter box and a second impeller which supplies water to the spray bar.

BRIEF DESCRIPTION OF THE DRAWINGS

Detailed descriptions of preferred embodiments of the invention will be made with reference to the accompanying drawings.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined by the appended claims.

Figure 2:
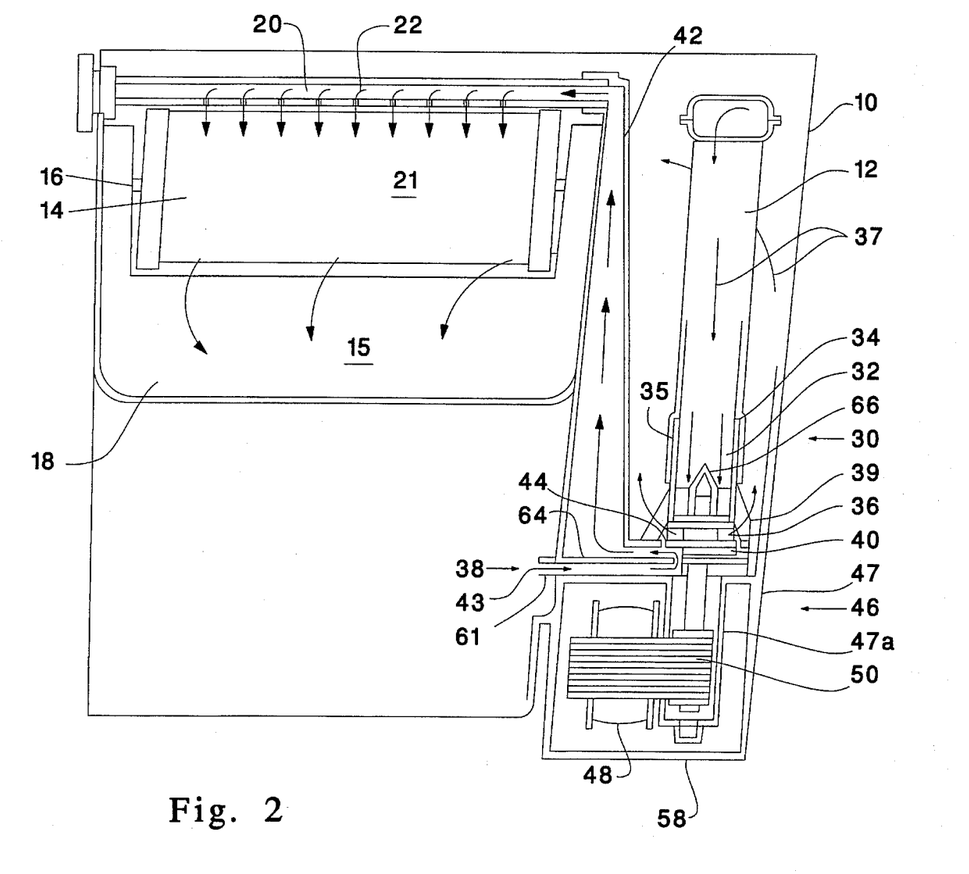
FIG. 2 is a sectional view of a first preferred embodiment of the present invention.

FIG. 2 illustrates one example of an aquarium filter system with which the present invention may be used. In the operation of such a system, water from an aquarium (not shown) is pumped into a filter box 10 through an intake tube 12 as indicated by arrows 37. A portion of aquarium water flows from the filter box 10 through a main filter element which includes one or both of a mechanical filter element and a chemical filter element (neither shown). The water then passes under, and in contact with a lower portion of, a biological filter element 14 as indicated by arrows 15. The biological filter element rotates about an axis 16 when impinged by the water. The filtered water then flows into a discharge spillway 18 and, finally, back into the aquarium.

In the aquarium filter system illustrated for example in FIG. 2, water is also pumped into a spray bar 20 which includes a number of holes 22. Holes 22 are preferably located at least above the axis of rotation of the biological filter element 14. Water from the spray bar 20 impinges the biological filter element 14 as indicated by arrows 21 and causes the biological filter element to rotate in the direction caused by the water discharged from the main filter element. Again, after the water passes the biological filter element 14, it flows back into the aquarium via the discharge spillway 18 as indicated by the arrows 15.

A pump in accordance with a first preferred embodiment of the present invention is indicated in FIG. 2 by reference numeral 30. The pump 30 includes an impeller housing 32 having a first entrance 34 to which the intake tube 12 may be slidably attached. Aquarium water entering the pump 30 through the first entrance 34 is propelled by a first set of impeller blades 36 into the filter box 10, as indicated by arrows 37. Impeller housing 32 also has a second entrance 38 which receives filtered water from the filter box 10. Filtered water received through the second entrance 38 is propelled by a second set of impeller blades 40 through a manifold 42 to the spray bar 20 as indicated by arrows 43. The impeller blades 36 and 40 may be separated by, and supported on, an impeller disc 44.

Figure 3:
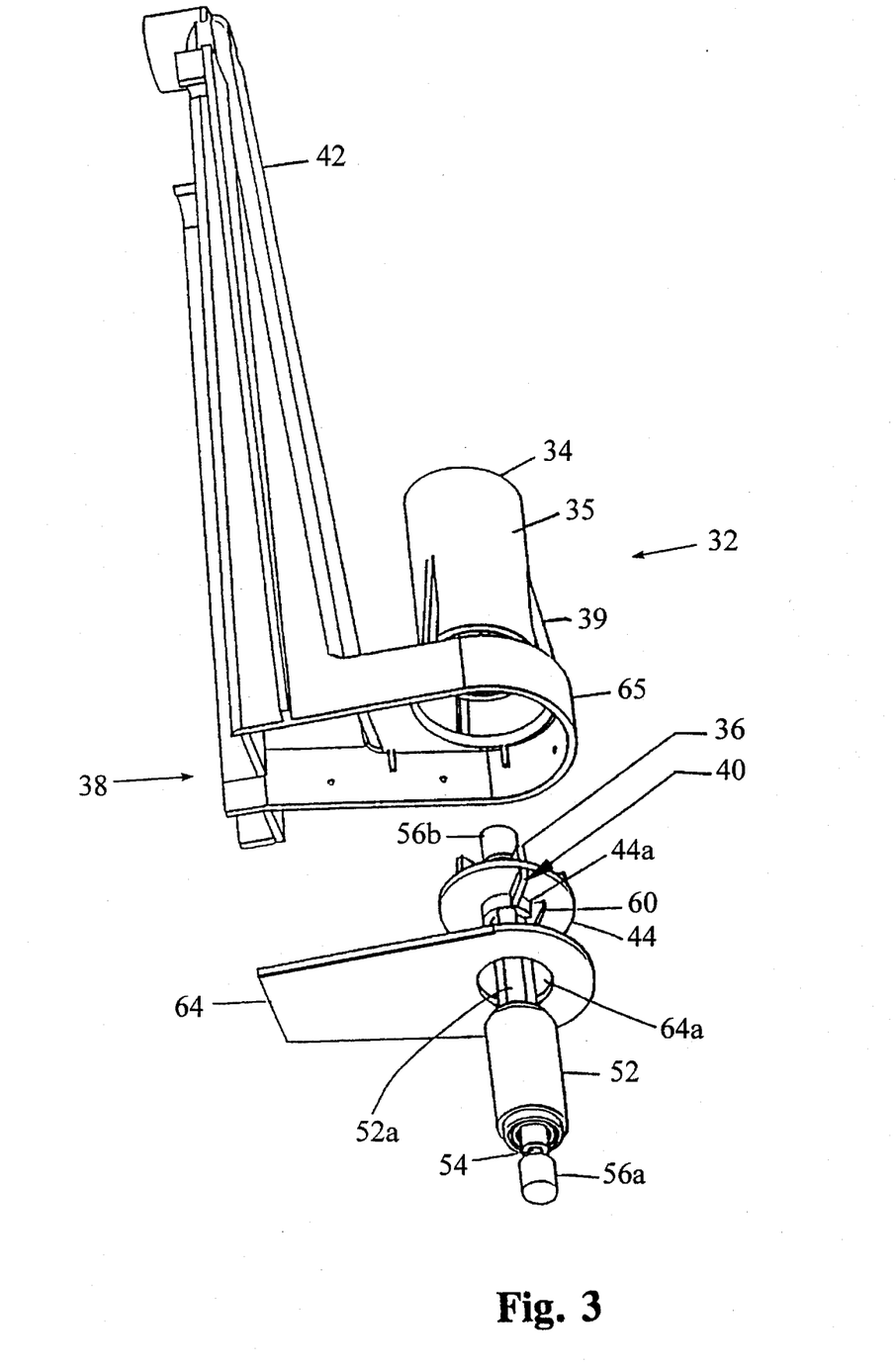
FIG. 3 is an exploded view of a manifold and impeller arrangement in accordance with the first preferred embodiment of the present invention.

The impeller disc 44 may be driven by a motor 46 which includes windings 48, stator laminations 50 and a rotor 52 (FIG. 3). Motor 46 is secured in a motor housing 47. Rotor 52 is installed in a well 47a (FIG. 2) formed as part of motor housing 47, stator windings 48 and laminations 50 being located outside of well 47a. Well 47a is made of a material which is permeable to the electromagnetic flux between the stator and rotor but is impermeable to liquid. Thus, while water which flows in via entrance 38 can flow in to well 47a, water will not contact windings 48 or laminations 50. As illustrated for example in FIG. 3, impeller disc 44 and rotor 52 are rotatably supported by a rod 54. The rod 54 is supported at one end by a rubber sleeve 56a which is received in a pocket 58 (FIG. 2) in the motor housing well 47a. The rod 54 may supported at the other end by a rubber sleeve 56b which is received in a pocket 66 (FIGS. 2, 4 and 5) in the impeller housing 32. A support member, or shaft, 52a extends between rotor 52 and impeller disc 44 to support impeller disc 44 and maintain the desired axial spacing between rotor 52 and impeller disc 44. Member 52a rotates with rotor 52 and carries a drive dog 60 which engages a portion 44a of impeller disc 44. To drive the impeller disc 44, an alternating current is supplied to the windings 48, creating an alternating magnetic field in the laminations 50. The magnetic field causes the rotor 52 to rotate at synchronous speed, thus driving the impeller disc 44 by the drive dog 60 and portion 44a of the impeller disc 44.

In the preferred embodiment illustrated in FIG. 2, the second entrance 38 is formed between a top wall 61 of the motor housing 47, and a bottom plate 64 and side wall 65 (best seen in FIG. 3) of the impeller housing 32. Bottom plate 64 is secured to side wall 65 in the manner shown in FIG. 5, so that a liquid-tight joint is formed between bottom plate 64 and side wall 65. Entrance 34 is the inlet end of a hollow cylinder 35 which forms a part of housing 32. Housing 32 further has a side wall 65 located below cylinder 35 and connected to cylinder 35 by legs 39 spaced apart around the circumference of cylinder 35. The spaces between legs 39 define openings 70.

Figure 4:
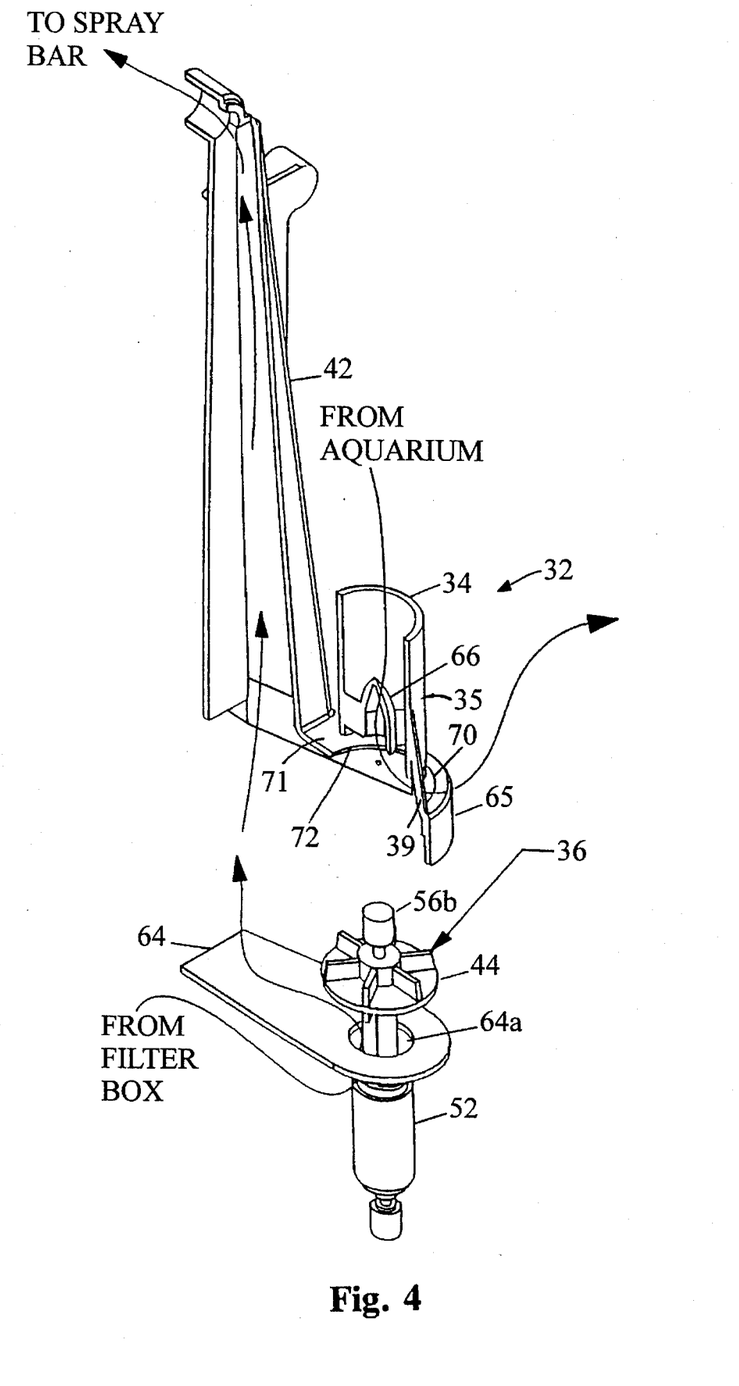
FIG. 4 is an exploded cutaway view of the manifold and impeller arrangement illustrated in FIG. 3.
Figure 5:
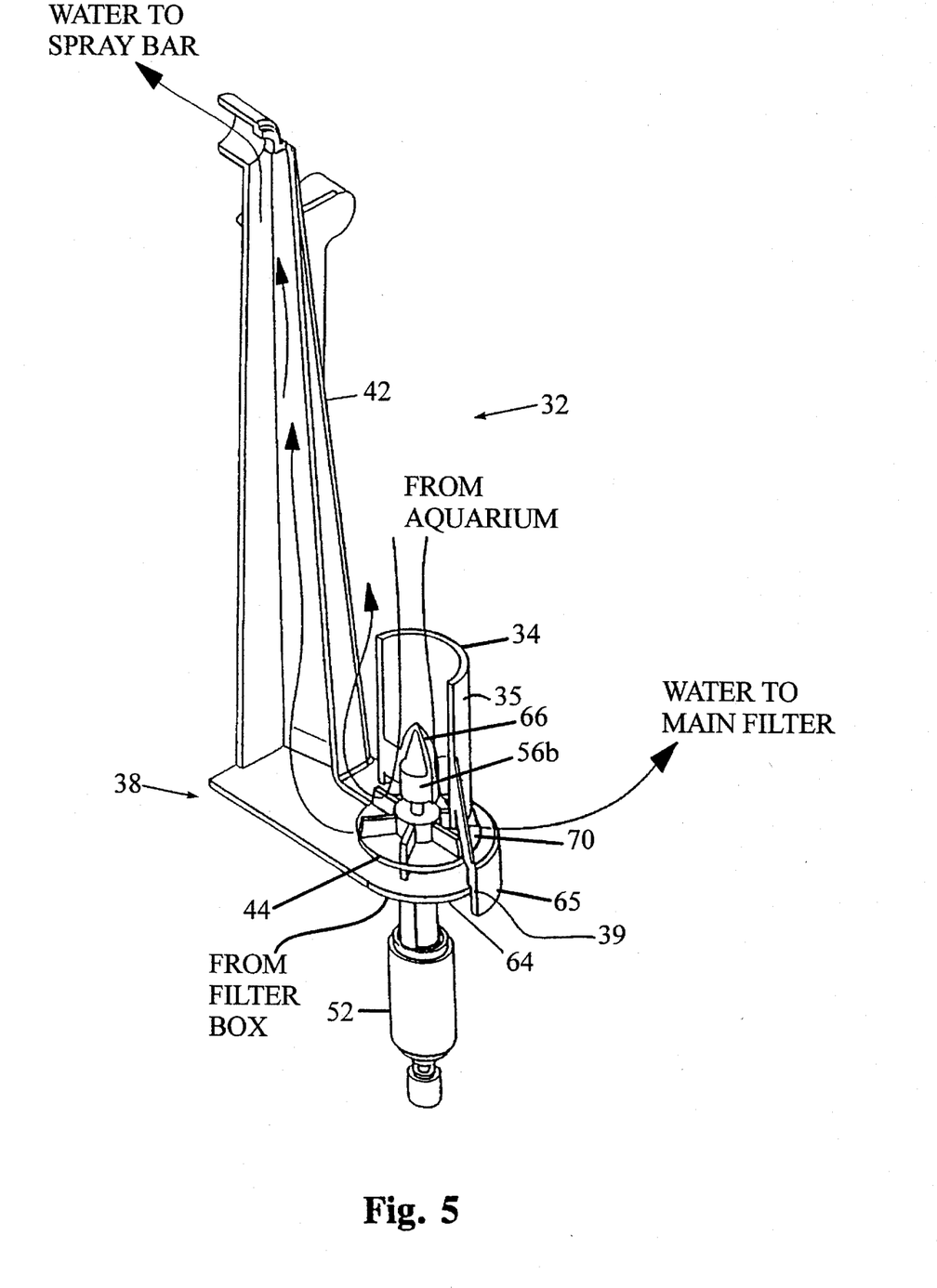
FIG. 5 is a cutaway view of the manifold and impeller arrangement illustrated in FIG. 3.

Housing 32 additionally includes a dividing wall 71, identified in FIG. 4, which is integral with, and located at the top edge of, side wall 65. Dividing wall 71 is located in the same plane as impeller disc 44 and is provided with a circular opening 72 dimensioned to create the smallest possible annular gap between wall 71 and impeller disc 44 without interfering with rotation of impeller disc 44. Referring for example to FIGS. 3–5, water entering the impeller housing 32 through the second entrance 38 flows beneath bottom plate 64 and is sucked through an aperture 64a in the bottom plate by the rotating impeller blades 40. The water then flows through the manifold 42 on its way to the spray bar 20. Water from the aquarium enters the impeller housing 32 through intake tube 12 and first entrance 34. The water is then propelled through openings 70 and into the filter box 10 (FIG. 2) by the impeller blades 36.

The flows produced by impeller blades 36 and 40 are maintained substantially separated from one another by the fact that the gap between wall 71 and impeller disc 44 is as small as possible and to permit substantially different hydrodynamic pressure levels to exist on both sides of impeller disc 44. Any minimal exchange of water between the two flows will not adversely affect achievement of the desired results.

Figure 6:
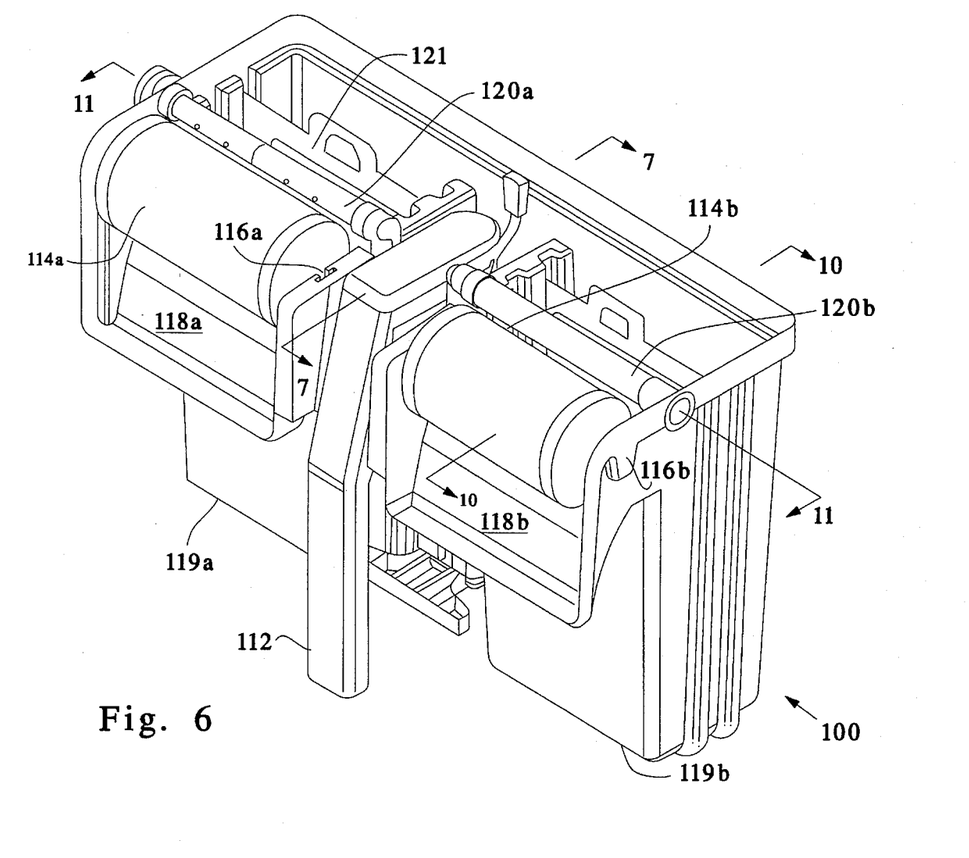
FIG. 6 is a perspective view of a second preferred embodiment of the present invention.

FIG. 6 illustrates another example of an aquarium filter system with which the present invention may be used. The system illustrated in FIG. 6 is similar to that illustrated in FIG. 2 to the extent that it employs mechanical and/or chemical filtration as well as biological filtration. The system in FIG. 6, however, contains two biological filter elements 114a and 114b and, accordingly, two spray bars 120a and 120b.

Figure 10:
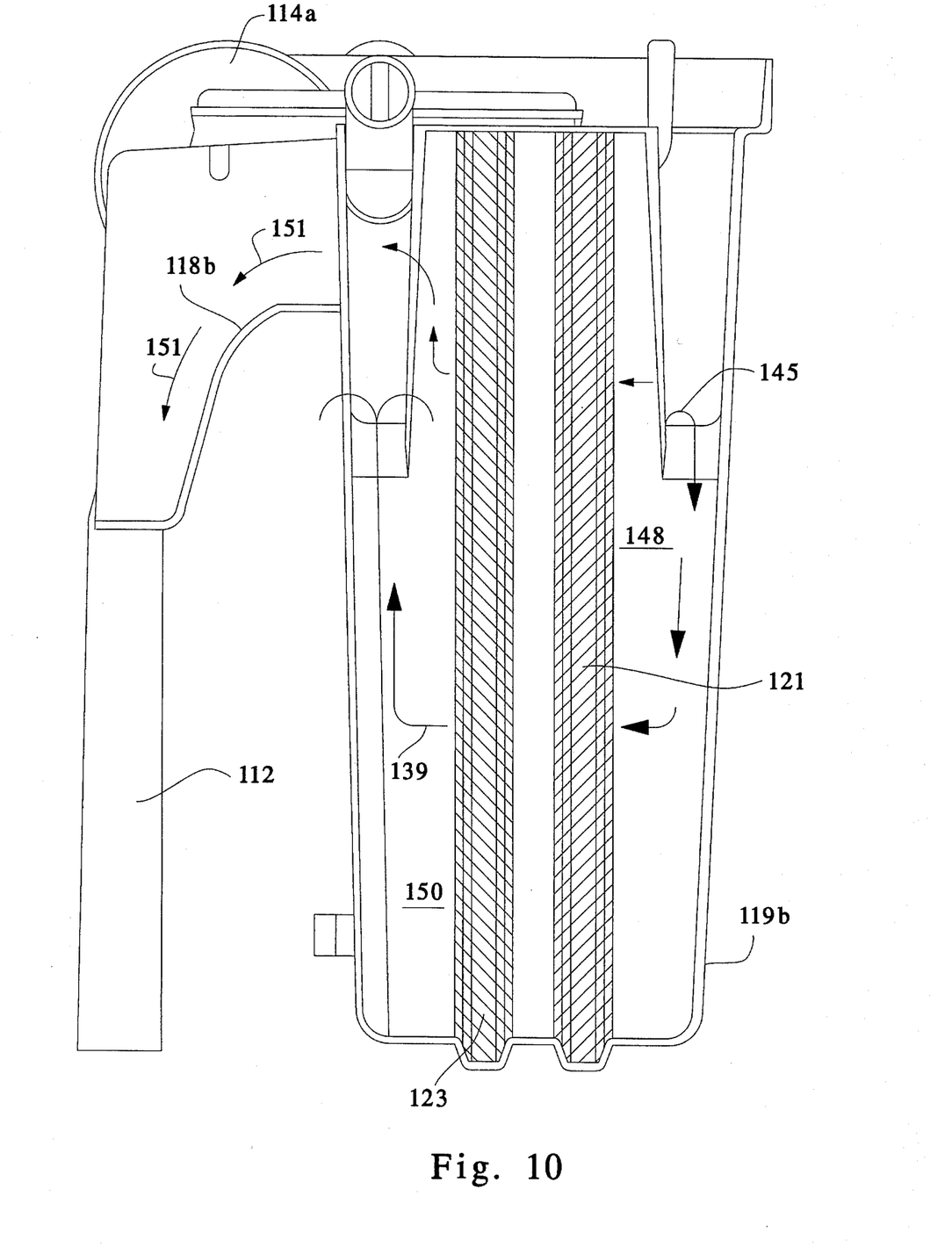
FIG. 10 is a side sectional view of a filter housing of the embodiment of FIG. 6.

In the aquarium filter system illustrated in FIG. 6, water from an aquarium (not shown) may be pumped into a filter box 100 through an intake tube 112. A portion of aquarium water may flow from the filter box 100 through a pair of main filter housings, 119a and 119b, each having one or both of a mechanical filter element 121 and a chemical filter element 123 (FIG. 10). The water then passes under the biological filter elements 114a and 114b. The biological filter elements 114a and 114b respectively rotate about a pair of axis 116a and 116b when impinged by the water. The filtered water may then flow into discharge spillways 118a and 118b and, finally, back into the aquarium.

Figure 7:
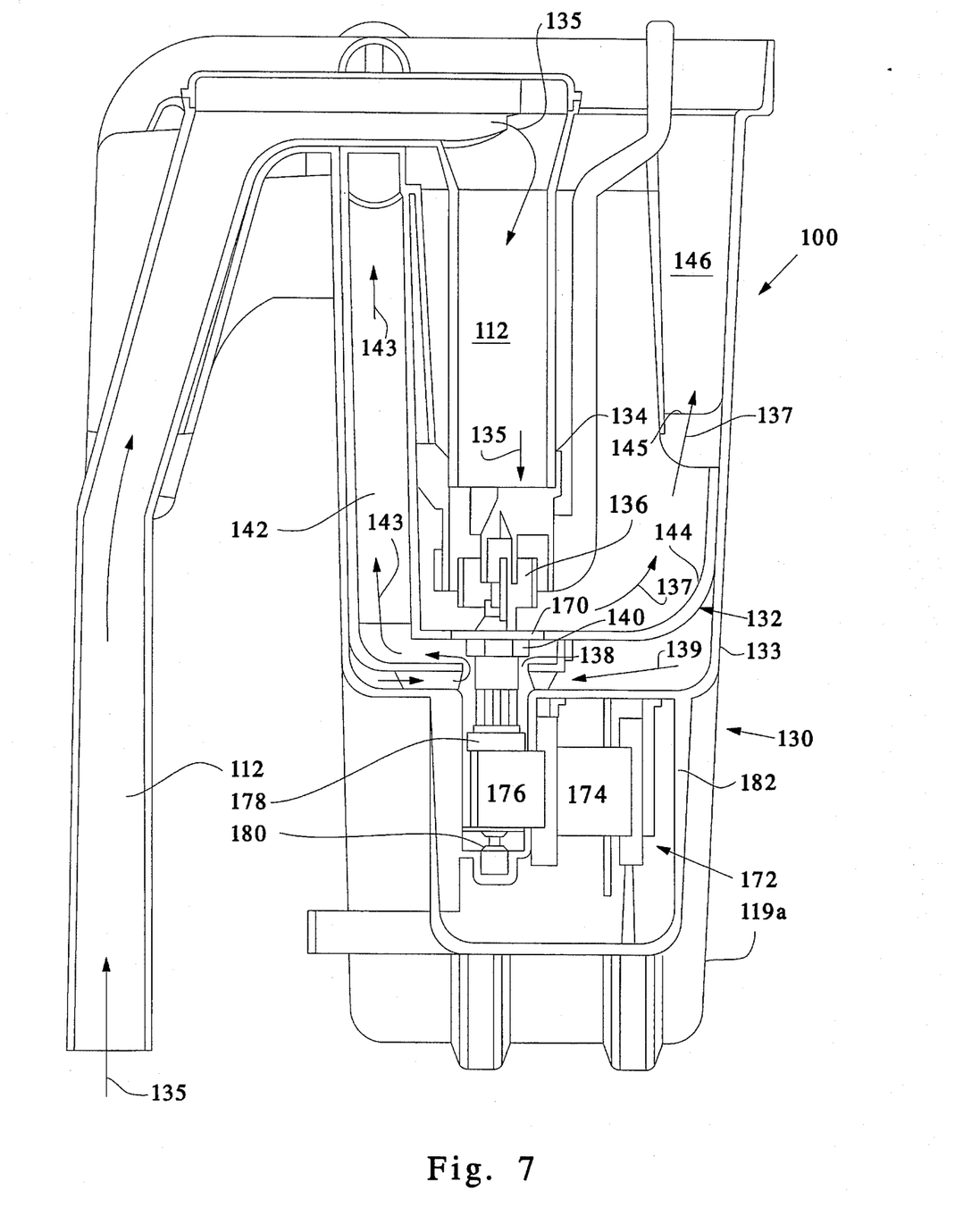
FIG. 7 is a side sectional view of the spray bar manifold, impeller housing and pump housing of the second preferred embodiment of the present invention.
Figure 8:
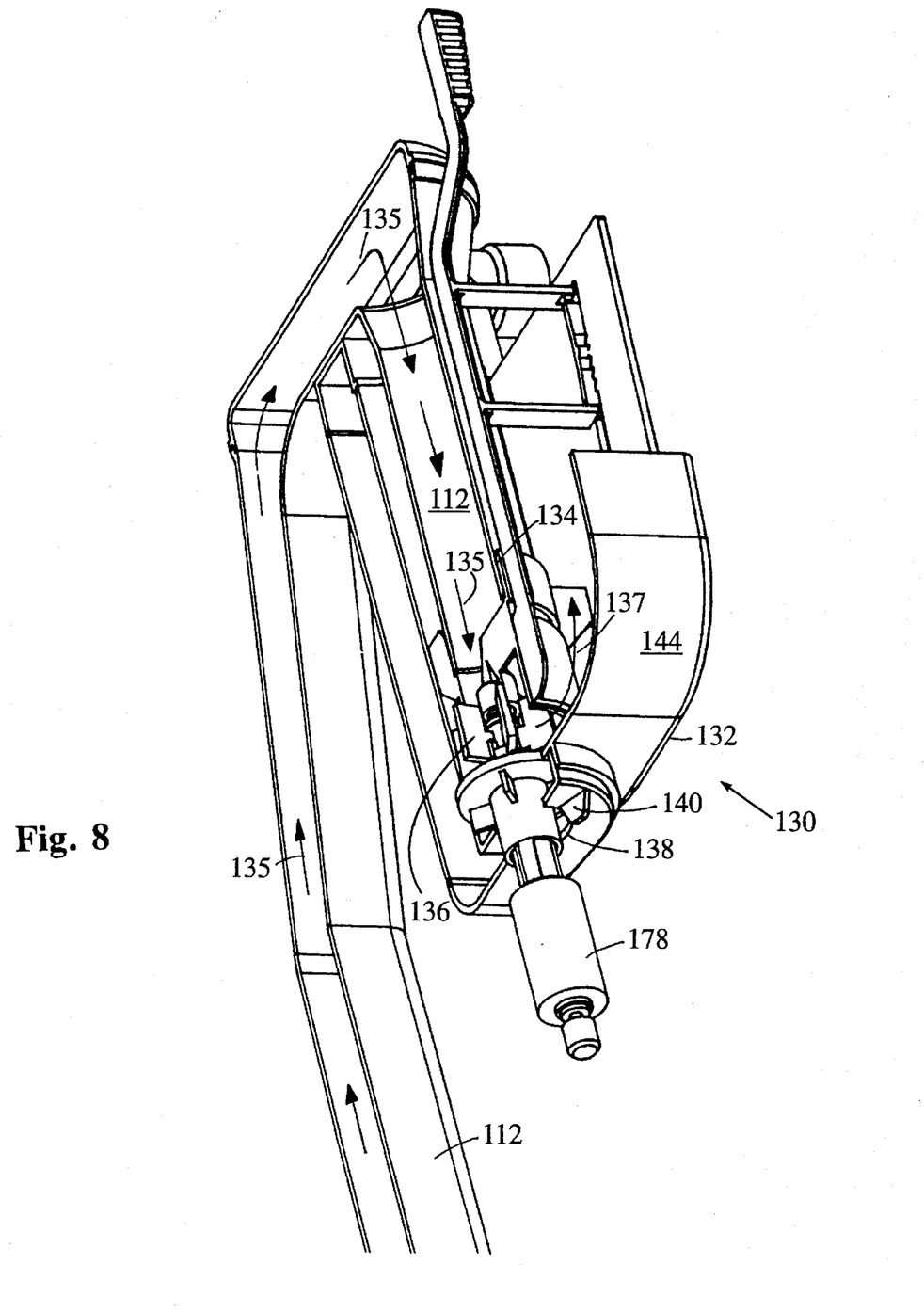
FIG. 8 is a cutaway view of the intake tube and impeller housing of the embodiment of FIG. 6.
Figure 11:
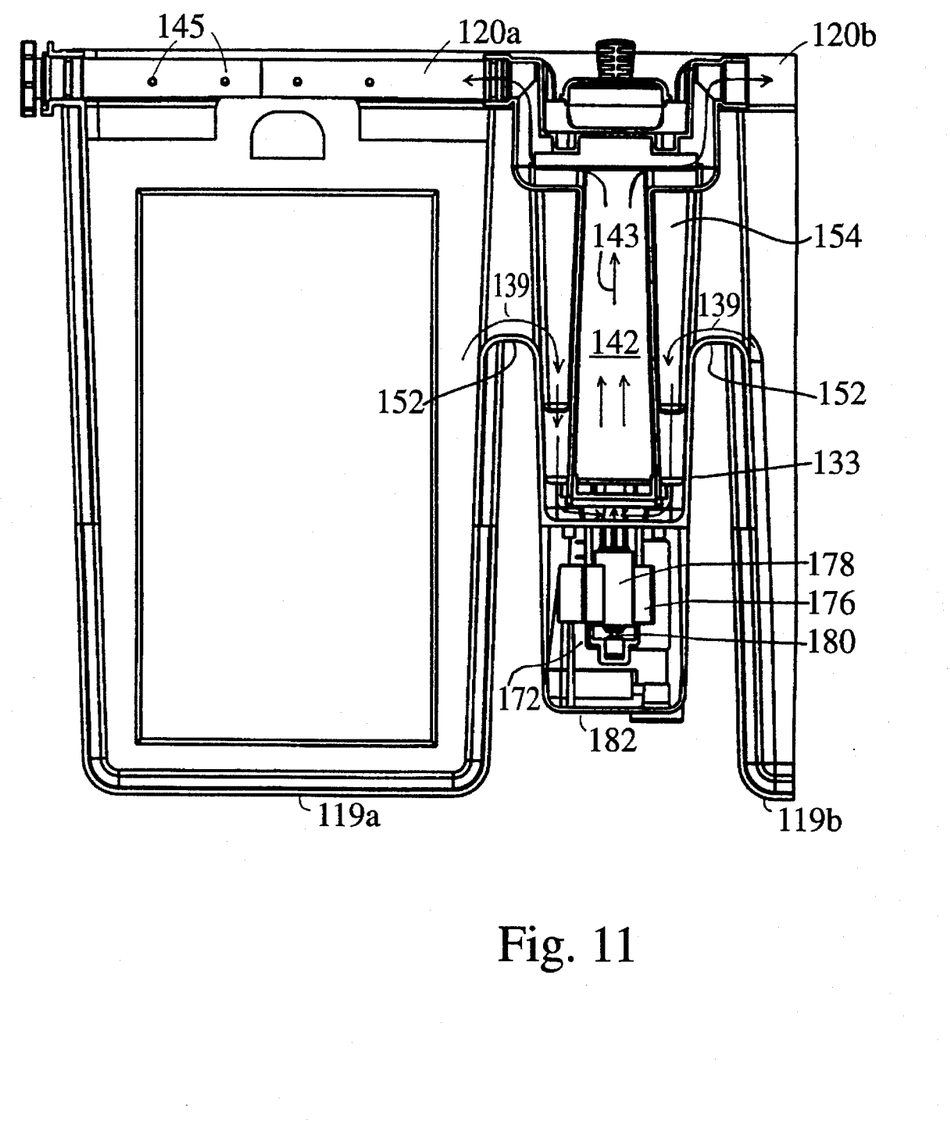
FIG. 11 is a partial front, sectional view of the filter housing, pump housing and impeller housing of the embodiment of FIG. 6.

One example of a pump in accordance with a second preferred embodiment of the present invention is indicated in FIGS. 7 and 8 by reference numeral 130. The pump 130 is adapted for use with the filtration system illustrated in FIG. 6. The pump 130 may include an impeller housing 132 which is sealed in a pump housing 133 connecting the main filter housings 119a and 119b (FIG. 11). The impeller housing 132 may include a first entrance 134 to which the intake tube 112 may be slidably attached. Aquarium water (represented by the arrow 135) entering the pump 130 through the first entrance 134 from the aquarium intake tube 112 may be propelled by a first impeller 136 into the filter housings 119a and 119b.

The impeller housing may also include a second entrance 138 (best seen in FIG. 9) which receives filtered water (as represented by the flow arrows 139) from the filter housings 119a and 119b. Water received through the second entrance 138 may be propelled by a second impeller 140 through a central manifold 142 (as presented by flow arrows 143) to the spray bars 120a and 120b.

As best seen in FIG. 7, the unfiltered water outflow 137 (from the first impeller 136 to the filter housings 119a and 119b) is separated from the filtered water inflow 139 (from the filter housings 119a and 119b to the second impeller 140) by a wall 144 of the impeller housing 132. The level of the water outflow 137 rises until it reaches a pair of filter intake weirs, one of which is indicated at 145 in FIGS. 7. Each weir 145 couples the rear 146 of the pump housing 133 to the rear 148 (FIG. 10) of one of the filter housings 119a or 119b. As best seen in FIG. 10, the water outflow 137 flows over the filter intake weir 145 and into the rear 148 of the associated filter housing 119a or 119b and is forced to pass first through the mechanical filter cartridge 121 and then through the chemical filter cartridge 123 to the front 150 of the filter housing.

At this point, the water has been mechanically and chemically filtered but not yet biologically filtered by the elements 114a or 114b. The majority of the filtered water flows (as represented by the flow arrows 151) out of the filter housings 119a and 119b over the discharge spillways 118a and 118b and past the rotating filter elements 114a and 114b, respectively. The water flow 151 is biologically treated by the rotating filter elements 114a and 114b before being discharged back into the aquarium.

Figure 9:
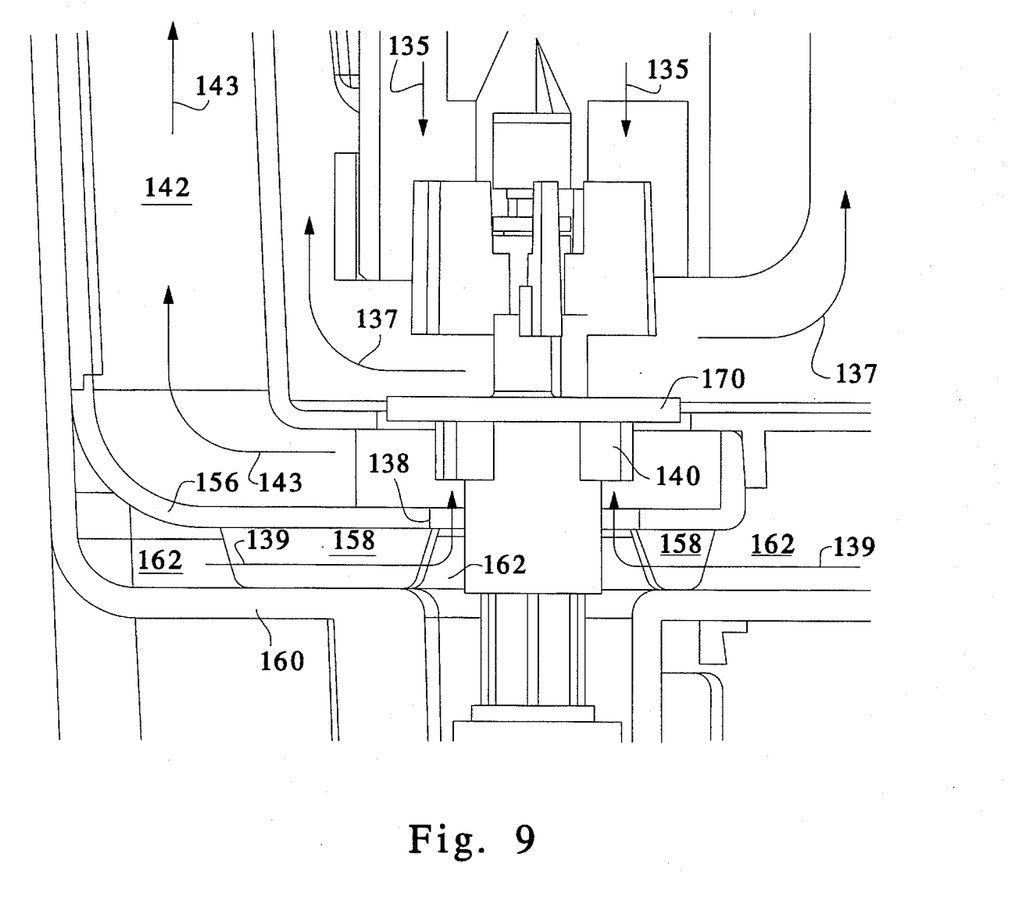
FIG. 9 is an enlarged cutaway view of the impellers, and a portion of the impeller housing and pump housing of the embodiment of FIG. 6.

However, as best seen in FIG. 11, a portion of the filtered water, as represented by the flow arrows 139, passes over pump intake weirs 152 coupling the fronts 150 of each the filter housing 119a and 119b to the the front 154 of the pump housing 133. Referring now to FIG. 9, the bottom wall 156 of the impeller housing 132 is spaced by feet 158 from an interior wall 160 of the pump housing 133 to provide a passageway 162 to the second entrance 138 of the impeller housing 132. The filtered water flow 139 from the filter housings 119a and 119b flows through the passageway 162 into the second entrance 138 and is driven by the second impeller 140 to the spray bar manifold 142 (FIG. 11) as represented by the water flow 143. The spray bars 120a and 120b spray the water from the manifold 142 through orifices 145 onto the rotating biological filters 114a and 114b (FIG. 6) to ensure proper rotational speed of the filters 114a and 114b. The flow from the spray bars 120a and 120b is at the same time biologically treated by the rotating filters 114a and 114b before being discharged back into the aquarium.

Referring now to FIGS. 7 and 11, the second impeller 140 carried by a separator disk 170 may be driven by a motor 172 which includes windings 174, stator laminations 176 and a rotor 178 which rotates about a rod 180. The motor 172 may be secured in a motor housing 182.

Figure 12:
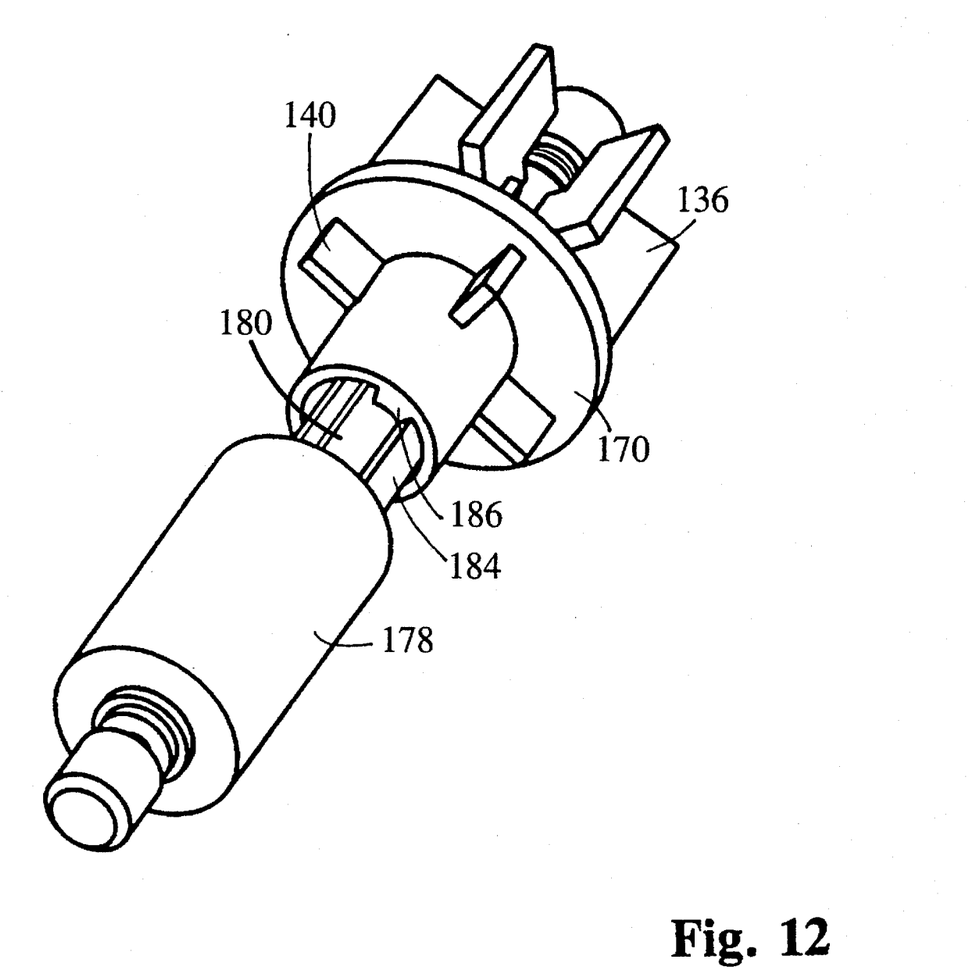
FIG. 12 is a perspective view of the lower impeller of the second preferred embodiment of the present invention.
Figure 13:
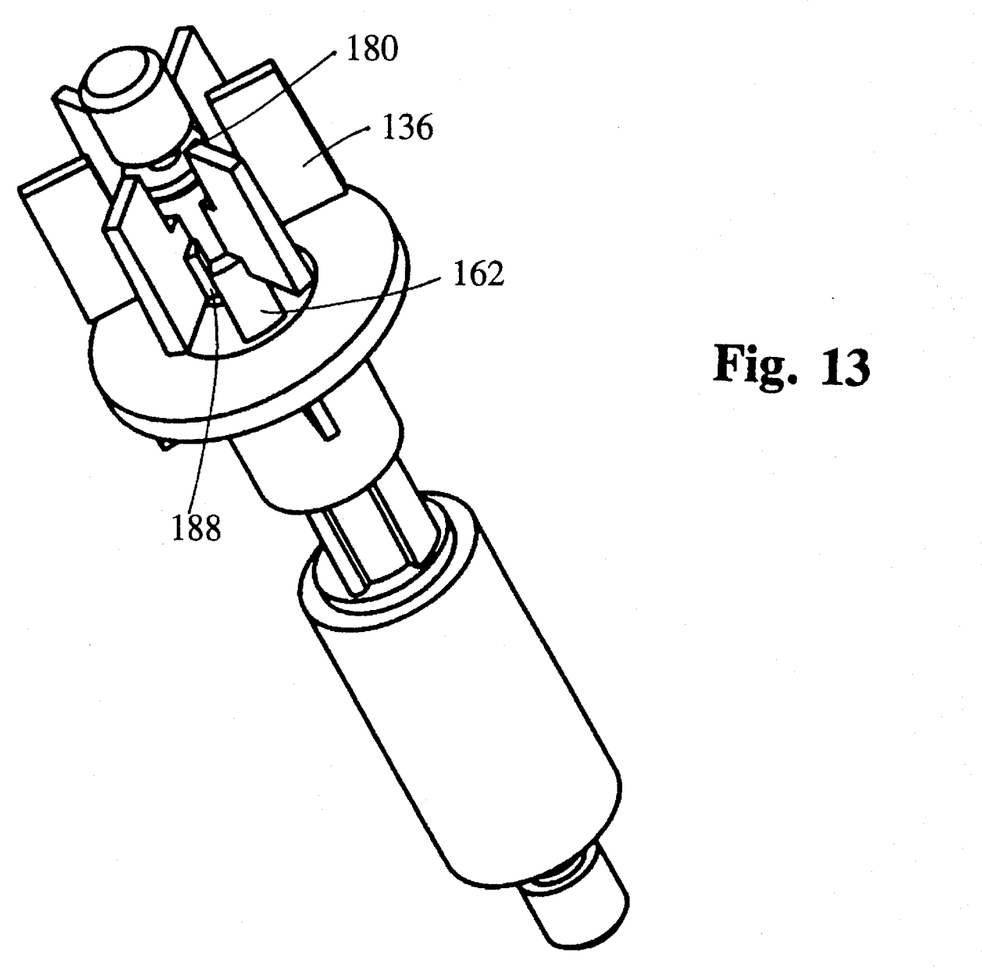
FIG. 13 is a perspective view of the upper impeller of the second preferred embodiment of the present invention.

As best seen in FIG. 12, the rotor 178 may include a drive dog 184 which contacts a portion 186 of the second impeller 140, thereby causing the second impeller to rotate about the rod 180. The separator disk 170 may, in turn, include a drive dog 162 (FIG. 13) which contacts a portion 188 of the first impeller 136, thereby causing the first impeller to rotate about the rod 180. In this manner, the rotor can momentarily rotate freely before it engages and drives the second impeller 140 which in turn can momentarily rotate freely before it engages and drives the first impeller 136. As a consequence, the rotor is permitted to come up to speed to an extent before being fully loaded to prevent the rotor from stalling.

In the embodiment illustrated in FIGS. 6–13, the size and shape of the impeller 136 has been designed to be substantially different from that of the impeller 140. More specifically, the impeller 136 is relatively tall and narrow and is spaced from the separation disk 141 whereas the impeller 140 is relatively short and wide and is connected to the separation disk 170. As a consequence, the pressures and flow rates of the two flows through the impeller housing are substantially different. The flow driven by the impeller 136 to the main filter elements is at a relatively high flow rate (approximately 250–400 gallons per hour) and a relatively low pressure (approximately 4 inches of head). In contrast, the flow driven by the impeller 140 to the spray bars 120a and 120b is at a relatively low flow rate (approximately 50 gallons per minute) and a relatively high pressure (approximately 8 inches of head). As a result, the two flows can be used for substantially different applications such as supplying the high pressure, low flow rate spray bars and supplying the low pressure, high flow rate filter elements. Thus, even though the two flows are substantially different, one having a flow rate more than double the other, a single rotor combined with the novel separated impellers such as those shown in FIG. 7 can be used efficiently to drive both flows.

As will be appreciated from a comparative consideration of FIGS. 2 and 6, the pump 130 may have a structure which, apart from motor 146, is symmetrical about a plane passing through the axis of rotation of impellers 136 and 140. Nonetheless, the filter box 100 may be readily modified to a single filter box unit by eliminating one of the two main filter housings 119a or 119b. Alternatively, the filter 10 can be readily modified to accommodate a second filter housing by providing a pump having a left-hand part identical to the left-hand part of pump 30 and a right-hand part which is a mirror image of the left-hand part.

Although the present invention has been described in terms of preferred embodiments above, numerous modifications and/or additions to the above-described preferred embodiment would be readily apparent to one skilled in the art. It is intended that the scope of the present invention extends to all such modifications and/or additions and that the scope of the present invention is limited solely by the claims set forth below.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A pump for use with an aquarium filter, comprising:

an impeller housing, the impeller housing defining first and second inlets and first and second outlets, an axis, first impeller blades associated with the first inlet and the first outlet, the first impeller blades being revolvable about the axis, second impeller blades associated with the second inlet and the second outlet, the second impeller blades being revolvable about the axis, an impeller disc interposed between, and coupled to, said first impeller blades and said second impeller blades, said impeller disc being revolvable about the axis along with said first and second impeller blades, and a motor having a rotor for driving the first and second impeller blades and the impeller disc, the rotor being rotatably mounted on the axis.

2. The pump of claim 1, wherein:
said impeller disc has first and second sides, the first impeller blades being mounted on the first side of the impeller disc and the second impeller blades being mounted on the second side of the impeller disc.

3. An aquarium, comprising:
a containment vessel having a plurality of walls for containing aquarium water;
a filter mounted adjacent one of the walls of the containment vessel, the filter including a filter box, a rotatable filter element and a spray bar for supplying water to the rotatable filter element; and
a pump disposed substantially within the filter, the pump including an impeller housing defining first and second flow paths, impeller means, mounted substantially within the impeller housing, for propelling water through the first flow path to the filter box and through the second flow path to the spray bar, and drive means for rotating the impeller means.

4. The aquarium of claim 3, wherein the impeller means comprises an impeller disc defining first and second sides, the first side including at least one impeller blade associated with the first flow path and the second side including at least one impeller blade associated with the second flow path.

5. The aquarium of claim 4, wherein the impeller housing defines a first inlet associated with the first side of the impeller disc and a second inlet associated with the second side of the impeller disc.

6. The aquarium of claim 5, wherein the first inlet is arranged to draw water from the containment vessel and the second inlet is arranged to draw water from the filter box.

7. The aquarium of claim 6, wherein the first inlet is adapted to support an intake tube.

8. The aquarium of claim 3, further comprising:
a shaft for rotatably supporting the impeller means,
wherein the drive means includes a motor having a rotor rotatably supported by the shaft, the rotor driving the impeller means about an axis of rotation.

9. The aquarium of claim 8, wherein the rotor includes a drive dog which contacts a corresponding portion of the impeller means.

10. The aquarium of claim 8, wherein the filter includes a motor housing, one end of the axis being supported by the motor housing and the other end of the axis being supported by the impeller housing.

11. The aquarium of claim 3, wherein the filter includes first and second rotatable filter elements and first and second spray bars for supplying water to the first and second rotatable filter elements, respectively, wherein the first flow path includes first and second branches, the second flow path includes first and second branches and the impeller means includes a first impeller associated with the first flow path and a second impeller associated with the second flow path.

12. The aquarium of claim 11, wherein the impeller housing defines a first inlet associated with the first impeller and second and third inlets associated with the second impeller.

13. The aquarium of claim 12, wherein the first inlet is arranged to draw water from the containment vessel and the second and third inlets are arranged to draw water from the filter box.

14. The aquarium of claim 13, wherein the first inlet is adapted to support an intake tube.

15. The aquarium of claim 11, further comprising:
a shaft for rotatably supporting the impeller means,
wherein the drive means includes a motor having a rotor rotatably supported by the shaft, the rotor driving the first impeller about an axis of rotation of the shaft.

16. The aquarium of claim 15, wherein the rotor includes a drive dog which contacts a corresponding portion of the first impeller and the first impeller includes a drive dog which contacts a corresponding portion of the second impeller.

17. The aquarium of claim 15, wherein the filter includes a motor housing, one end of the axis being supported by the motor housing and the other end of the axis being supported by the impeller housing.

18. A method of filtering aquarium water, comprising:
driving a first impeller with a rotor to impel unfiltered water at a first flow rate from the aquarium through a filter box and past a biological filter to filter the water;
discharging a portion of the filtered water back into the aquarium;
driving a second impeller with the same rotor, to impel a portion of the water from the filter box at a second and lower flow rate to a spray bar; and
spraying water from the spray bar at the biological filter to rotate the biological filter.

19. A water filter comprising: a filter box, a rotatable filter element mounted for filtering water flowing from said filter box, a spray bar for supplying water to said rotatable filter element, and a pump, said pump comprising:
an impeller housing defining first and second flow paths coupled to the filter box and spray bar, respectively,
impeller means, mounted substantially within the impeller housing, for propelling water through the first and second flow paths and
drive means for rotating the impeller means.

20. The filter of claim 19, wherein the impeller means comprises first impeller blades associated with the first flow path and second impeller blades associated with the second flow path.

21. The filter of claim 20, wherein the impeller means further comprises an impeller disc defining first and second sides, the first impeller blades being disposed at the first side of the impeller disc and the second impeller blades being disposed at the second side of the impeller disc.

22. The filter of claim 21, wherein the first impeller blades are spaced from the impeller disc.

23. The filter of claim 20, wherein the impeller housing defines a first inlet associated with the first impeller blades and a second inlet associated with the second impeller blades.

24. The filter of claim 23, wherein the first inlet is arranged to draw water from an aquarium and the second inlet is arranged to draw water from the filter box.

25. The filter of claim 24, wherein the first inlet is adapted to support an intake tube.

26. The filter of claim 20 wherein the first and second impeller blades have predetermined configurations so that the water flowing through the first flow path is at a higher flow rate and lower pressure than that of the water flowing through the second flow path.

27. The filter of claim 19, further comprising:
a shaft for rotatably supporting the impeller means,
wherein the drive means includes a motor having a rotor rotatably supported by the shaft, the rotor driving the impeller means about an axis of rotation of the shaft.

28. The filter of claim 27, wherein the rotor includes a drive dog which contacts a corresponding portion of the impeller means.

29. The filter of claim 27, wherein the water filter includes a motor housing, one end of the axis being supported by the motor housing and the other end of the axis being supported by the impeller housing.

30. A water filter comprising: a filter box, first and second rotatable filter elements mounted for filtering water flowing from said filter box, first and second spray bars for respectively supplying water to said first and second rotatable filter elements, and a pump, said pump comprising:

an impeller housing defining first and second flow paths, the second flow path including first and second branches, impeller means, mounted substantially within the impeller housing, for propelling water through the first flow path to the filter box and through the first and second branches of the second flow path to the first and second spray bars, respectively, and drive means for rotating the impeller means.

31. The filter of claim 30, wherein the impeller means comprises a first impeller associated with the first flow path and a second impeller associated with the second flow path.

32. The filter of claim 31, wherein the impeller housing defines a first inlet associated with the first impeller and second and third inlets associated with the second impeller.

33. The filter of claim 32, wherein the first inlet is arranged to draw water from an aquarium and the second and third inlets are arranged to draw water from the filter box.

34. The filter of claim 33, wherein the first inlet is adapted to support an intake tube.

35. The filter of claim 31, further comprising:

a shaft for rotatably supporting the impeller means, wherein the drive means includes a motor having a rotor rotatably supported by the shaft, the rotor driving the first impeller about an axis of rotation of the shaft.

36. The filter of claim 35, wherein the rotor includes a drive dog which contacts a corresponding portion of the second impeller and the second impeller includes a drive dog which contacts a corresponding portion of the first impeller.

37. The filter of claim 35, wherein the water filter includes a motor housing, one end of the axis being supported by the motor housing and the other end of the axis being supported by the impeller housing.

38. The filter of claim 31, wherein the first and second impellers have predetermined configurations so that the water flowing through the first flow path is at a higher flow rate and lower pressure than that of the water flowing through the second flow path.

* * * * *